United States Patent
Lee (12)

(10) Patent No.: US 6,454,971 B1
(45) Date of Patent: Sep. 24, 2002

(54) PROCESS FOR PRODUCING TILES FROM WASTE MATERIAL

(76) Inventor: Tien-Te Lee, No. 1-8, Shen-Nung Rd., Pei-Tou Chen, Chang-Hua Hsien (TW)

( * ) Notice: Subject to any disclaimer, the term of this patent is extended or adjusted under 35 U.S.C. 154(b) by 0 days.

(21) Appl. No.: 09/954,107

(22) Filed: Sep. 17, 2001

(51) Int. Cl.⁷ ................................................ B29B 17/00
(52) U.S. Cl. .................... 264/37.1; 264/37.29; 264/37.3
(58) Field of Search ............................. 264/37.1, 37.29, 264/37.3; 405/128

(56) References Cited

U.S. PATENT DOCUMENTS 5,439,318 A * 8/1995 Stark .......................... 405/128

* cited by examiner

*Primary Examiner*—Christopher A. Fiorilla
(74) *Attorney, Agent, or Firm*—Ladas & Parry

(57) ABSTRACT

In a process for producing tiles, the waste material is ground to a reduced size, ferrous metals are removed from the waste material, the waste material is mixed with a binder to form a mixture after grinding, and the mixture is molded to form the tiles. The binder includes magnesium oxide, a regulating agent for accelerating the hardening of the magnesium oxide, a modifying agent selected from a water-reducing agent, a water-repellent agent, a water-resistant enhancing agent, and an active agent which can react with excess magnesium ions in the binder to form an insoluble magnesium salt, and a degrading agent for degrading heavy metal toxic substances contained in the waste material.

12 Claims, No Drawings

PROCESS FOR PRODUCING TILES FROM WASTE MATERIAL

BACKGROUND OF THE INVENTION

1. Field of the Invention

The invention relates to a process for producing tiles, particularly to a process for producing tiles from waste material including industrial and household wastes.

2. Description of the Related Art

It is known in the art to produce tiles and building blocks from trash and a binding composition composed of magnesium oxide, magnesium chloride and a modifying agent. The modifying agent is used to reduce excess magnesium ions which can result in moisture absorption in the final products, and includes ferrous sulfate, copper sulfate, magnesium sulfate, potassium permanganate, urea-formaldehyde resin and ammonium chloride. A conventional process for producing tiles includes the steps of adding an amount of magnesium chloride into an amount of water to form an aqueous solution of magnesium chloride, adding an amount of the modifying agent and an amount of magnesium oxide into the aqueous solution of magnesium chloride, stirring homogeneously to form the binding composition, mixing the binding composition with the waste material, which is pre-treated, and molding the resulting mixture into tiles. Although the aforesaid process can produce tiles from waste material to achieve the purpose of waste recycling, the tile produced thereby has the following shortcomings:

1. Since the effect of the modifying agent is insufficient, the excess magnesium ions remaining in the tiles can result in moisture absorption which can reduce toughness and produce cracks.
2. Since the modifying agent is devoid of an ingredient to degrade heavy metal toxic substances in the waste material, the toxic substances remaining in the tiles are liable to degrade in use and tend to release foul and/or toxic gases which are harmful to the environment.

In the process of the prior art, the binding composition consisting of magnesium chloride, water, magnesium oxide and the modifying agent is produced first, and is subsequently added to the pre-treated waste material. It is difficult to mix the waste material with the individual ingredients constituting the binding composition homogeneously, which would in turn adversely affect the effect of the binding composition to bind the waste material, thereby reducing the toughness of the tiles.

SUMMARY OF THE INVENTION

Therefore, the object of the present invention is to provide a process for making tiles, which can solve the problems encountered in the prior art, such as moisture absorption, susceptibility to cracking, reduced toughness, and the release of foul and/or harmful gases.

According to this invention, a process for producing tiles comprises the steps of:

(1) grinding waste material to a reduced size;
(2) removing ferrous metals from the waste material; and
(3) mixing the waste material with a binder to form a mixture after grinding, and molding the mixture,
wherein the binder comprises:
magnesium oxide;
a regulating agent for accelerating the hardening of the magnesium oxide;
a modifying agent selected from the group consisting a water-reducing agent, a water-repellent agent, a water-resistant enhancing agent, and an active agent which can react with excess magnesium ions in the binder to form an insoluble magnesium salt; and
a degrading agent for degrading heavy metal toxic substances contained in the waste material.

DETAILED DESCRIPTION OF THE PREFERRED EMBODIMENTS

The process of this invention contemplates recycling waste material, such as those containing organic and inorganic substances. The waste material includes industrial wastes and household wastes. The household wastes may contain kitchen waste, vegetable and fruit residue, paper, plastics, wood segments, fibers, glass, metals, etc.

In the process according to the present invention, the waste material is subjected to grinding, preferably followed by a sieving step so as to reduce the size of the waste material. Ferrous metal substances are preferably removed from the waste material via a magnetic selector.

Magnesium oxide is a main binder component used in the present invention. The regulating agent is used to assist in hardening of the magnesium oxide, and is preferably selected from the group consisting of magnesium chloride, magnesium sulfate, and ferrous sulfate.

The modifying agent used in the process of the present invention may be selected from the group consisting of: a water-reducing agent such as naphthyl sulfonate; a water-repellent agent such as inorganic ferric salt (for example, ferric chloride and ferrous sulfate) and inorganic aluminum salt; a water-resistant enhancing agent such as a water-soluble or water-emulsifiable polymer selected from the group consisting of styrene-methyl acrylate copolymer, polymethyl acrylate, polyvinylidene chloride, ethyl silicate and butyl benzene; and an active agent which can react with excess magnesium ions to form an insoluble magnesium salt. Preferably, the active agent is selected from the group consisting of pumice, ashrock, phosphate, copper sulfate and hydrochloric acid.

In order to remove heavy metal toxic substances from the waste material and to prevent the tiles produced by the present invention from releasing toxic substances and unpleasant odor, the degrading agent is used in the process for the purposes of reducing or eliminating toxicity of the heavy metal toxic substances contained in the waste material. The degrading agent usable in the present invention includes at least one compound selected from the group of consisting of vitamin, such as vitamin B12 and vitamin C, tetrahydrofolid acid, and a chelating agent, such as ethylenediamine tetracetic acid.

The regulating agent and the modifying agent used in the process of the present invention must be of a suitable amount so as to prevent the final products produced thereby from absorbing moisture. In a preferred embodiment of the present invention, based on 100% by weight of the mixture of the waste material and the binder, the amount of the waste material is 60% to 80%, the amount of the magnesium oxide is 19–25%, the amount of the regulating agent is 11.7–13%, the amount of the modifying agent is 1.04–1.60%, and the amount of the degrading agent is 0.26 to 0.40%.

The following examples further illustrate the preferred embodiments of the invention, but are not to be construed as limiting.

EXAMPLES

Example 1

The ingredients used in the process of this example contain the following components:

household trash: 680 kg magnesium oxide: 190 kg magnesium chloride: 117 kg a mixture of naphthyl sulfonate, ferrous sulfate, polymethyl acrylate and phosphoric acid: 10.4 kg vitamin B12: 2.6 kg Firstly, the household trash is ground to a predetermined reduced size by a grinder.

Ferrous metals are removed from the ground trash via a magnetic selector.

Afterwards, the ground trash is sieved by a vibrating sieve so as to collect the ground trash with a size ranging from 10 to 30 mm.

117 kg of magnesium chloride powder is added to 130 kg of water to form an aqueous magnesium chloride solution.

Then, 10.4 kg of a mixture of naphthyl sulfonate, ferrous sulfate, polymethyl acrylate and phosphoric acid, and 2.6 kg of vitamin B12 are added to the aqueous magnesium chloride solution. After stirring homogeneously, a mixture solution is obtained.

190 kg of magnesium oxide powder and the aforesaid mixture solution are added to 680 kg of the ground trash. Finally, the resulting mixture is molded to produce tiles or building blocks.

Example 2

The ingredients used in the process of this example contain the following components:

household trash: 600 kg magnesium oxide: 250 kg magnesium chloride: 130 kg a mixture of ferric chloride, ferrous sulfate, styrene-methyl acrylate copolymer and copper sulfate: 16 kg a mixture of tetrahydrofolic acid, vitamin C and ethylenediamine tetraacetic acid: 4 kg.

The household trash is ground and sieved so that the size of the trash is reduced to about 10–20 mm. The process of this example is carried out following the same procedures as those employed in Example 1. In this example, 130 kg of magnesium chloride powder is added to 127 kg of water to form an aqueous magnesium chloride solution.

Example 3

The ingredients used in the process of this example contain the following components:

industrial trash: 640 kg magnesium oxide: 220 kg magnesium chloride: 125 kg a mixture of aluminum chloride, polyvinylidene chloride and phosphate: 12 kg a mixture of vitamin B12, vitamin C and ethylenediamine tetraacetic acid: 3 kg The industrial trash is ground and sieved so that the size of the trash is reduced to about 40–120 mm. The process of this example is carried out following the same procedures as those employed in Example 1. In this example, 125 kg of magnesium chloride powder is added to 129 kg of water to form an aqueous magnesium chloride solution.

Example 4

The ingredients used in the process of this example h contain the following components:

architectural trash: 635 kg magnesium oxide: 225 kg magnesium sulfate: 125 kg a mixture of naphthyl sulfonate, ferric oxide, ethyl silicate, butyl benzene, and hydrochloric acid: 13 kg a mixture of tetrahydrofolic acid and ethylenediamine tetraacetic acid: 2 kg.

The architectural trash is ground and sieved so that the size of the trash is reduced to about 40–120 mm. The process of this example is carried out following the same procedures as those employed in Example 1. In this example, 125 kg of magnesium sulfate powder is added to 129 kg of water to form an aqueous magnesium sulfate solution.

In view of the aforesaid, the following effects can by achieved by this invention:

1). Due to the increased amount of the modifying agent used in this invention, the agent can react with the excess magnesium ions to form an insoluble magnesium salt. Therefore, the problem of moisture absorption encountered in the prior art can be avoided, and the toughness of the tile can be enhanced.

2). The degrading agent in the composition according to this invention can degrade heavy metal toxic substances contained in the waste material in advance, so as to prevent the tiles from releasing foul and/or toxic gases.

3). In the process according to this invention, the magnesium oxide powder and the mixture solution including the regulating agent, the modifying agent and the degrading agent in water are added into the ground waste material with a desired size simultaneously. Therefore, the ingredients contained in the composition according to this invention can be mixed evenly with the waste material. The toughness of the tiles produced from the inventive composition can be enhanced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A process for producing tiles from waste material, comprising the steps of:

1) grinding the waste material to a reduced size;
   2) removing ferrous metals from the waste material;
   3) mixing the waste material with a binder to form a mixture after grinding; and
   4) molding the mixture, wherein said binder comprises:
   magnesium oxide;
   a regulating agent for accelerating hardening of the magnesium oxide;
   a modifying agent selected from the group consisting of a water-reducing agent, a water-repellent agent, a water-resistant enhancing agent, and an active ingredient which can react with excess magnesium ions in said binder to form an insoluble magnesium salt; and
   a degrading agent for degrading heavy metal toxic substances contained in the waste material, said degrading agent including at least one compound selected from the group consisting of vitamin, tetrahydrofolid acid, and a chelating agent.

2. The process according to claim 1, wherein the amount of said degrading agent is 0.26–0.40 parts by weight per 100 parts of said waste material.

3. The process according to claim 1, further comprising the step of sieving the waste material prior to mixing of the waste material with said binder.

4. The process according to claim 1, wherein said regulating agent is selected from the group consisting of magnesium chloride, magnesium sulfate, and ferrous sulfate.

5. The process according to claim 4, wherein said water-reducing agent is naphthyl sulfonate.

6. The process as claimed in claim 5, wherein said water-repellent agent is selected from the group consisting of inorganic salts of iron, and inorganic aluminum salts.

7. The process as claimed in claim 6, wherein said water-resistant enhancing agent is a water-soluble or water-emulsifiable polymer selected from the group consisting of styrene-methyl acrylate copolymer, polymethyl acrylate, polyvinylidene chloride, ethyl silicate and butyl benzene.

8. The process as claimed in claim 7, wherein said active agent is selected from the group consisting of pumice, ashrock, phosphate, copper sulfate, and hydrochloric acid.

9. The process according to claim 1, wherein, based on 100% by weight of mixture of said waste material and said binder, the amount of said waste material is 60% to 80%, the amount of said magnesium oxide is 19–25%, the amount of said regulating agent is 11.7–13%, the amount of said modifying agent is 1.04–1.60%, and the amount of said degrading agent is 0.26 to 0.40%.

10. The process according to claim 1, wherein said binder is prepared and mixed with the waste material via the steps of:

(a) mixing said regulating agent with water to form an aqueous solution;

(b) adding said modifying agent and said degrading agent to said aqueous solution and stirring the same homogeneously; and (c) adding said magnesium oxide and the mixture of said modifying agent and said degrading agent to the waste material.

11. The process according to claim 1, wherein said vitamin is selected from the group consisting of vitamin B12 and vitamin C.

12. The process according to claim 1, wherein said chelating agent is ethylenediamine tetraacetic acid.

* * * * *